(No Model.) 2 Sheets—Sheet 1.

E. B. MEYROWITZ & F. BUCHHOP.
ELECTRIC MOTOR.

No. 447,734. Patented Mar. 3, 1891.

Witnesses
H. R. Lauly
Howell Butt

Inventors
Emil B. Meyrowitz.
Ferdinand Buchhop.
By their Attorney (No Model.) 2 Sheets—Sheet 2.

E. B. MEYROWITZ & F. BUCHHOP.
ELECTRIC MOTOR.

No. 447,734. Patented Mar. 3, 1891.

Witnesses

Inventors
Emil B. Meyrowitz.
Ferdinand Buchhop.
By their Attorney

UNITED STATES PATENT OFFICE.

EMIL B. MEYROWITZ, OF RIDGEFIELD, NEW JERSEY, AND FERDINAND BUCHHOP, OF NEW YORK, N. Y.; SAID BUCHHOP ASSIGNOR TO SAID MEYROWITZ.

ELECTRIC MOTOR.

SPECIFICATION forming part of Letters Patent No. 447,734, dated March 3, 1891.

Application filed May 24, 1890. Serial No. 353,074. (No model.)

*To all whom it may concern:*

Be it known that we, EMIL B. MEYROWITZ, of Ridgefield, in the State of New Jersey, and FERDINAND BUCHHOP, of New York, in the State of New York, citizens of the United States, have jointly invented a new and useful Improvement in Electric Motors, of which the following is a specification.

This invention relates to portable electro-magnetic motors for light work, such as that of surgeon-dentists; and the invention consists in certain novel combinations of peculiarly constructed and arranged parts, as hereinafter set forth and claimed.

The objects of this invention are to adapt the working parts to be inclosed in a neat and substantially spherical casing or shell and to simplify the construction of small motors.

Two sheets of drawings accompany this specification as part thereof.

Figure 1:
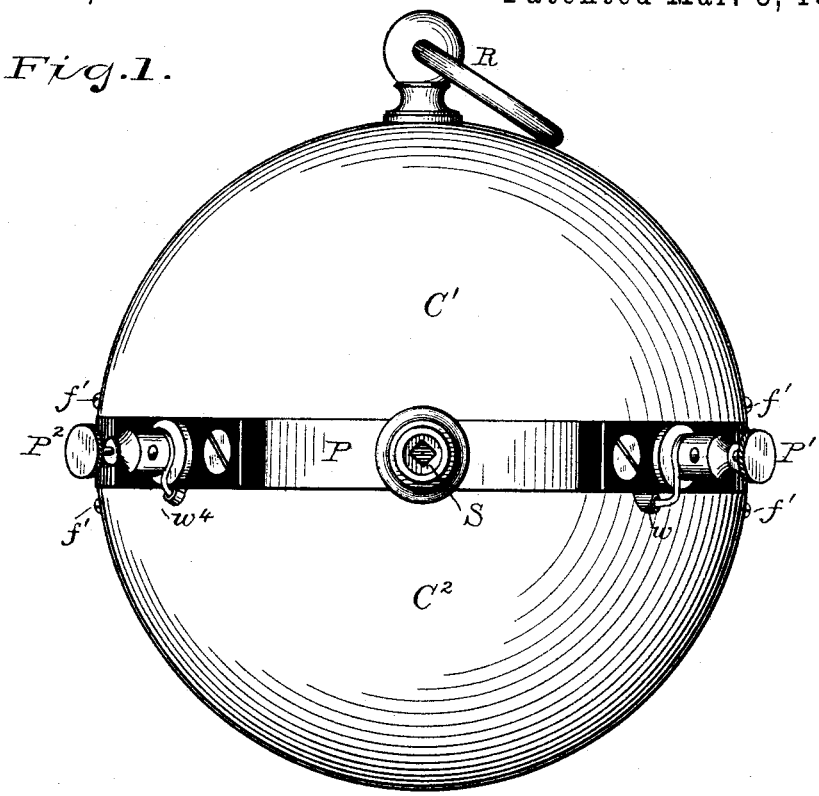
Figure 2:
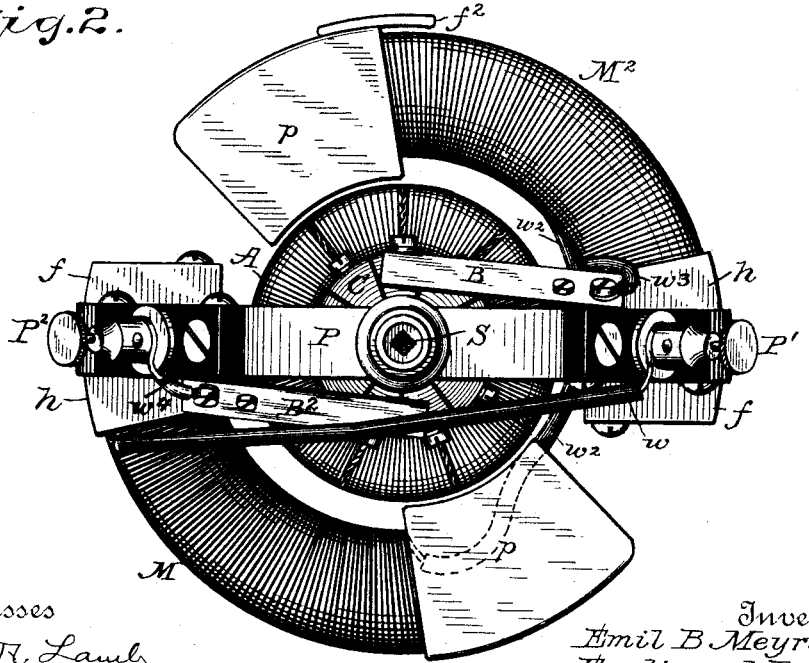
Figure 3:
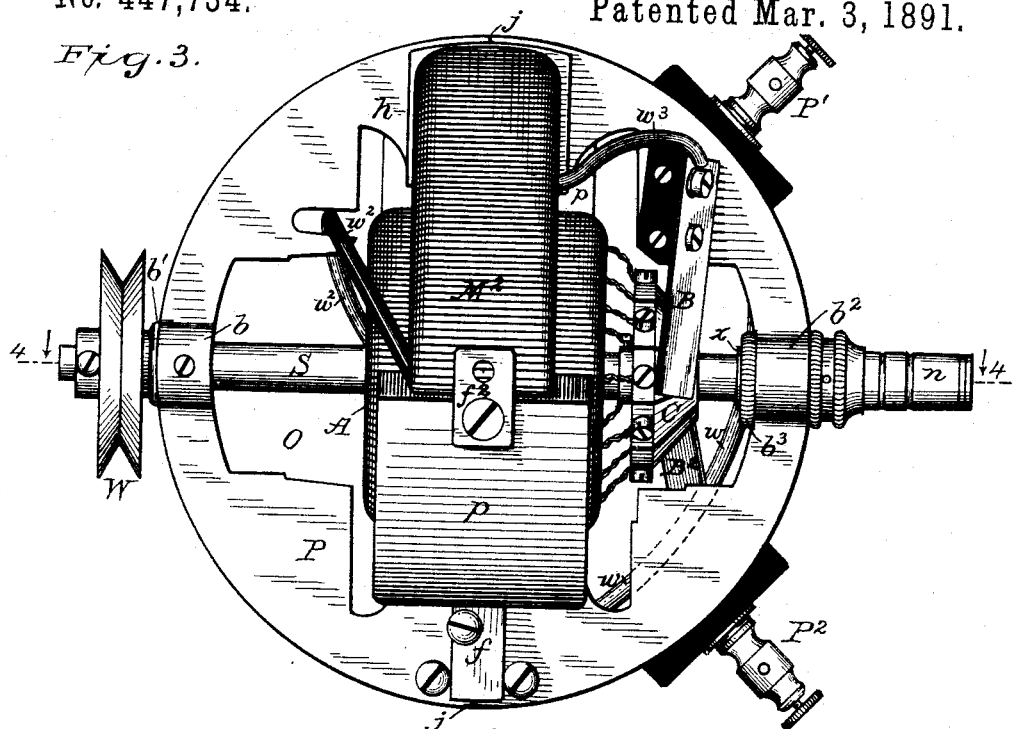
Figure 4:
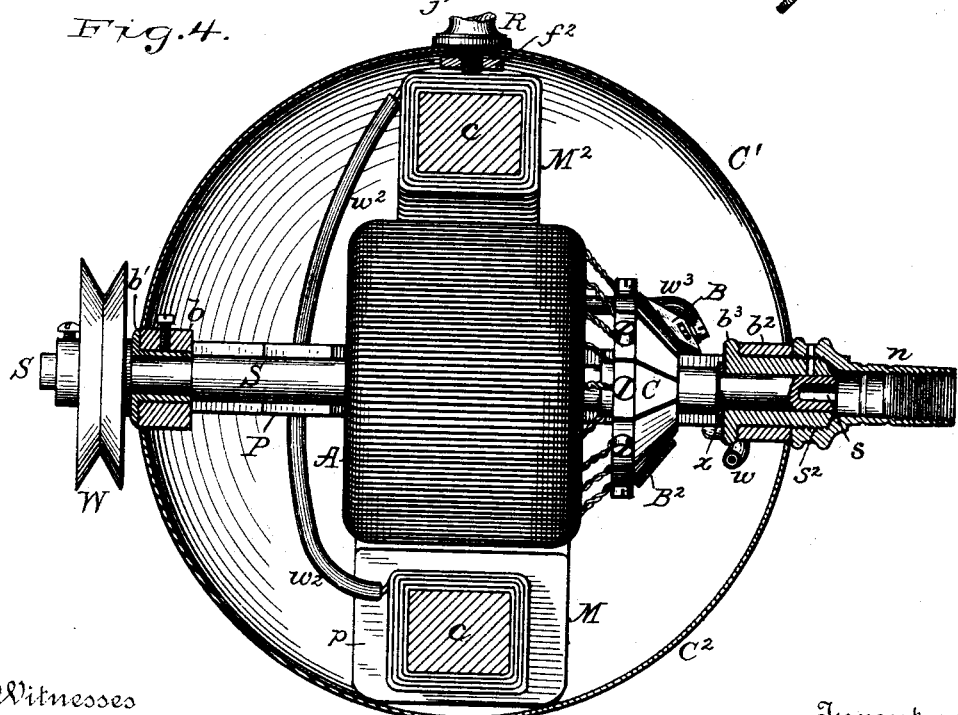

Figure 1 of the drawings is a side view of our motor, showing its external appearance. Fig. 2 is an elevation from the same point of view with the casing removed. Fig. 3 is a top view of the parts shown in Fig. 2. Fig. 4 represents an elevation of the armature-spindle and the parts carried thereby and a section through the surrounding parts in the plane represented at 4 4, Fig. 3.

Like letters of reference indicate corresponding parts in the several figures.

The cores $c$, Fig. 4, of a pair of suitably-curved field-magnets M M$^2$ are rigidly coupled to and supported by a circular equatorial frame-plate P, the respective magnets projecting from the opposite sides of the plate at opposite edges, as shown in Fig. 2, and terminating in pole-pieces $p$, having concentric inner and outer surfaces and located diametrically opposite each other in a line oblique to the plane of the frame-plate.

The binding-posts P' P$^2$ are conveniently attached with interposed blocks of vulcanite to the periphery of the frame-plate P, and the coils of the field-magnets are conveniently connected in series from the positive post P' by insulated wires $w$ and $w^2$, as shown in Figs. 2 and 4.

The armature A is preferably a Gramme ring of small diameter rotating centrally between the poles of the field-magnets within an opening O, Fig. 3, in the frame-plate, its several coils being connected in customary manner with corresponding metallic sections of the commutator C, as shown in Figs. 2 to 4. The peripheral contact-surface of the commutator is preferably beveled or conical, as shown in Figs. 3 and 4, to coact with a pair of flat brushes B B$^2$, which press against said conical surface at diametrically-opposite points, being supported at the proper angles by suitably-beveled blocks of vulcanite interposed between them and the respective sides of the frame-plate to which they are so attached. As compared with the employment of a cylindrical commutator, more certain contacts are thus insured with reduced friction and with a saving of space, which is important in connection with the primary object of this invention.

The brush B is connected by insulated wire $w^3$ with the terminal of the coils of the field-magnets, and the brush B$^2$ is connected by insulated wire $w^4$ with the negative binding-post P$^2$, as best seen in Fig. 2.

The armature-spindle S is fast within the armature and commutator and occupies radial bearings $b$ $b^2$, Figs. 3 and 4, formed in the frame-plate P at its perimeter in a line at right angles to the plane of the field-magnets. Both ends of the spindle protrude and are provided respectively with a motion-transmitting wheel W and with an axial socket $s$ for coupling thereto a flexible shaft, or to receive the tang of a suitable tool to be carried by the spindle. The bearing $b$, through which the wheel end of the spindle projects, is provided with a simple bushing $b'$, of suitable brass or bronze, held in place by a radial screw. The bushing $b^3$ of the bearing $b^2$ is preferably combined with a nozzle $n$ for the attachment of the customary sheath for the flexible shaft when the latter is used, the two being united end to end by a screw-joint $s^2$, which serves also to draw collars on the respective parts against the ends of the bearing $b^2$, and thus to render the bushing tight. A loose washer $x$ is interposed between a shoulder on the socket end of the spindle and the inner end of said bushing $b^3$, to aid in preventing wear due to endwise thrust of the spindle. The frame-plate P constitutes the usual magnetic connection between the cores of the field-magnets M M², and is consequently of iron. To facilitate milling out the opening O and assembling the parts, the frame-plate is diametrically divided in the plane of the field-magnets, as shown at $j$, Fig. 3, the parts being rigidly reunited by the heels $h$ of the respective magnet-cores $c$, which cross the plate-joint and are clamped fast by screws. The frame-plate is further provided at these points with a pair of fastening-pieces $f$, each of which is attached by a screw to the opposite side of the plate as compared with the adjacent core-heel $h$, and the outer surfaces of the core-heels and fastening-pieces are located just within the circular edge of the plate and are curved concentrically therewith and with the field-magnet poles. The outer surface of the pole-piece $p$ of the magnet M² is also provided with a screw-attached fastening-piece $f^2$.

All the parts above described on the respective sides of the frame-plate P are inclosed within nearly hemispherical casing parts C′ C², of any preferred material, corresponding in diameter to the frame-plate at their edges and attached by fastening-screws $f'$ to said core-heels $h$ and fastening-pieces $f$. The outer surfaces of the casing parts are thus rendered flush with the peripheral surface of the frame-plate, and the casing as a whole may form a true sphere.

A central opening in the upper casing part C′ admits the screw-stem of a ring attachment R to a threaded vertical hole in said fastening-piece $f^2$, and screwing home this ring attachment completes the structure.

The motor may be suspended by its ring or may rest in a tripod or other suitable support or be held in the hands while in operation with equal facility, and presents a neat and pleasing appearance, as indicated in Fig. 1, which is a desideratum in a motor for surgeon-dentists and like users.

Details which have not been specified may be of any approved description, and we do no limit our respective claims to mechanical details, except as therein expressly stated.

Having thus described our said electric motor, we claim as our invention and desire to patent under this specification—

1. A spherical electric motor comprising an equatorial frame-plate with the binding-posts attached to its periphery, field-magnets supported by said plate within its perimeter, an armature rotating between the poles of said magnets, a pair of hemispherical or nearly hemispherical casing parts adjoining said frame-plate on its respective sides, a motion-transmitting spindle which protrudes from within the casing, and suitable electrical connections and accessories, substantially as hereinbefore specified.

2. In a spherical electric motor, an equatorial frame-plate having binding-posts attached, with interposed insulators, to its periphery, in combination with a pair of field-magnets having cores attached to said plate within its perimeter and magnetically connected thereby, an armature rotating between the poles of said magnets, a motion-transmitting spindle, and suitable electrical connections and accessories, substantially as hereinbefore specified.

3. In a spherical electric motor, an equatorial frame-plate having a suitable opening therein, in combination with a pair of field-magnets having cores attached to said plate on its respective sides at diametrically-opposite points and curved in one and the same circular line, a central armature rotating between the poles of said magnets, a motion-transmitting spindle, and suitable electrical connections and accessories, substantially as hereinbefore specified.

4. In a spherical electric motor, the combination, with an equatorial frame-plate having a suitable opening therein, of a central rotary armature, an armature-spindle in the plane of the frame-plate, curved field-magnets attached to said plate and surrounding or partly surrounding said armature, a commutator carried by the armature-spindle, insulated brushes carried by said plate, and suitable electrical connections, substantially as hereinbefore specified.

5. In a spherical electric motor, the combination, with an equatorial frame-plate, of insulated binding-posts attached to its periphery, field-magnets attached to its respective sides and magnetically connected thereby, a central rotary armature, an armature-spindle in the plane of the plate, a commutator carried by the armature-spindle, insulated brushes attached to the respective sides of the plate, and insulated wires connecting the positive binding-post with the coils of the field-magnets in series, said coils with one of the brushes and the other brush with the negative binding-post, substantially as hereinbefore specified.

6. In a spherical electric motor, an equatorial frame-plate having a suitable central opening and divided diametrically, in combination with a pair of field-magnets, the cores of which have heels whereby the magnets are attached to the respective sides of the plate and the parts of the plate are united, an armature rotating within said opening, a motion-transmitting spindle, and suitable electrical connections and accessories, substantially as hereinbefore specified.

EMIL B. MEYROWITZ.
FERDINAND BUCHHOP.

In presence of—
WM. H. WOODHULL,
H. A. JANSING.